UNITED STATES PATENT OFFICE.

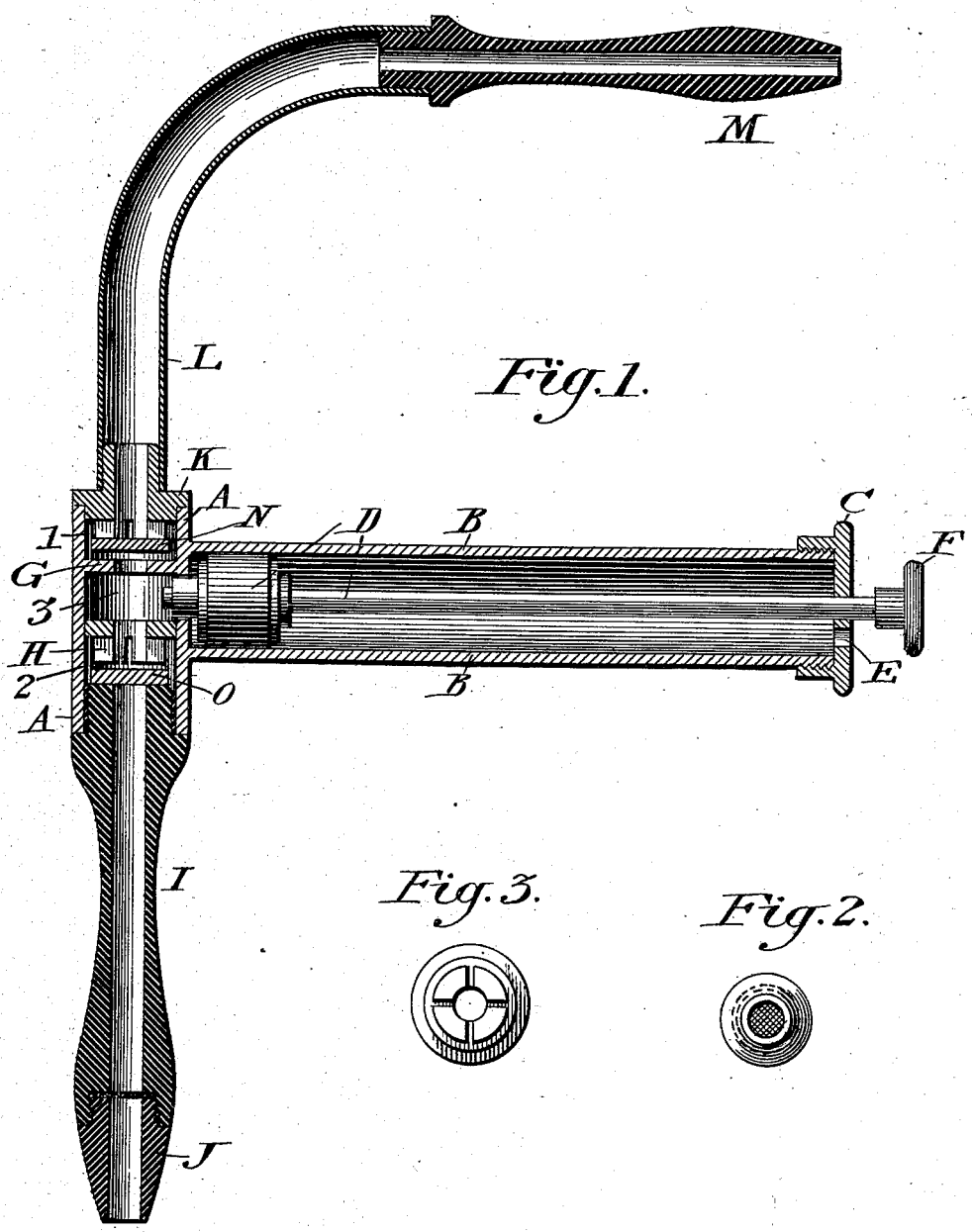

JOSEPH R. PERRY, OF WILKESBARRE, PENNSYLVANIA.

EXTRACTING-SYRINGE.

SPECIFICATION forming part of Letters Patent No. 714,738, dated December 2, 1902.

Application filed June 6, 1902. Serial No. 110,436. (No model.)

*To all whom it may concern:*

Be it known that I, JOSEPH R. PERRY, a citizen of the United States, residing at the city of Wilkesbarre, in the county of Luzerne and State of Pennsylvania, (whose post-office address is No. 33 West Jackson street,) have invented new and useful improvements in extracting gas, fluids, or excrement from the system and combined the same with a syringe, which instrument I call an "extracting-syringe," of which the following is a specification.

The object of my invention is to relieve pain caused by bloating, colic, cramps, and derangements generally of the stomach, intestines, colon, and rectum by a direct application of the nozzle of the gas-extractor to the rectum and pumping the gas from the body. It may also be used as a vaginal syringe or for injecting purposes, which are fully illustrated by the drawings accompanying this specification.

Figure 1 is a sectional view cut through the center of the machine and its adjuncts throughout. Fig. 2 is a top view of a disk or screen for the prevention of coarse materials from passing the pipes. Fig. 3 is a top view of a plug and stem of one of its ends and also of the one end of the inner plug H.

In Fig. 1, a section of the whole machine, we have A A, showing the edges of a piece of tubing, preferably made of brass, although the same may be composed of vulcanite or any suitable materials. The said section is brazed at right angles to another piece of tubing B B, forming a cross-section air pipe and chambers having a cap C at its end, threaded to tube B B. Within the tube B B is a plunger D, consisting of a piece of turned brass or vulcanite and packed to fit the said tube with cotton, wick, or thread, or any suitable materials to make it air-tight against the pipe and produce a suction within the same. There is an opening E through the cap C to allow the air in the tube to escape and to freely fill the same in operating the piston-rod F. Within the tube A A are securely placed the partitions G and H, having suitable openings through their central portion to allow gas or excrement or fluid matter to pass. These partitions are driven into the tube A A perfectly air-tight and form an inner recess or chamber No. 3. To the end of tube A A is fitted the nozzle or pipe I, suitably turned and smoothed to enter the rectum. It is tightly packed to fit tube A A. Pipe I is composed of two parts. The part J is threaded into part I and contains a disk or perforated sieve, as shown by top view, Fig. 2. Pipe I is made with a suitable opening throughout its length. On the opposite end of tube A A is placed a plug K, having a stem extending outward, intended to receive another flexible tube L, which flexible tube or pipe is secured to another nozzle or discharge-pipe M, having a suitable opening throughout. Said pipe M may be made of rubber or vulcanite, this pipe and flexible tube to carry away the extracted materials. The stopper K within the chamber of tube A A is formed with a recess, making it something less than the diameter of said tube, this space to admit of gas or other materials to surround it. There is also a disk valve N placed within the tube formed by stopper and partition G on the end of stopper K. The recessed portion is creased to allow gas or other materials to pass out around disk valve. The end of said recess-plug K is more fully seen in Fig. 3, which is a view of the inner portion, showing recess and the creases cut thereon. The partition-plug H is also formed with a similar recess and creased down its full depth for the same purpose. The second end chamber formed by the partition H and the end of pipe I contains a disk valve O, similar to disk valve N. The plugs G and H also form a middle chamber No. 3, from which the gas or fluids are drawn into tube B B.

When it is desired to operate the gas-extractor, the nozzle-pipe I should be suitably greased with lard or other lubricating substance and carefully inserted into the rectum, gently forcing it through the sphincter muscle, which will usually hold it firmly. To operate, hold the pipe B B with one hand and draw upon the piston-rod F with the other. The suction will close the valve N tightly over the opening and against the partition G, closing the hole in G, while at the same time it will draw the valve O away from the end of the extracting-pipe I and suck it against the inner end of the partition H, thereby allowing the gas to pass around the recess in partition H and through its opening into the middle chamber No. 3, and thus completely filling pipe or chamber B B. Then by reversing the force by pushing down piston-rod F the gas or other materials will close the end of pipe I by forcing valve O against it and open the valve N by forcing it against the plug K and allowing the gas or fluid to pass around the recess and creases in plug K and out into the flexible tube L and through the other pipe M. In this way every stroke of the piston F will be drawing the gas out of the rectum. The pipe M may be directed into a suitable vessel or into the water-closet and the gas or fluid materials allowed to escape, thus by operating a short time affording almost immediate relief. If peristaltic action is produced thereby in the bowels or rectum and it is thought necessary to more thoroughly cleanse the system, the machine may immediately be converted into a syringe, as follows: Place the nozzle or pipe I into warm water or any fluid to be injected and the pipe M into the rectum, and operating the piston-rod F as before will force the fluid into the bowels to any extent desired, or if it is desired at any time to be used as a vaginal cleanser or syringe the pipe I must be placed into the fluid to be injected and the nozzle-pipe M inserted into the vaginal cavity and the piston-rod F used in the manner described. It may also be used for horses, cows, or other animals suffering from the effects of bloating or any of the beforenamed causes and can be made of any suitable dimensions for veterinary uses. Forming the valve-chamber A A and the pipe I and flexible tubing and pipe M and uniting them to the tube B B at right angles gives the most appropriate and best facility for using the hands in operating the device. After using the machine it may be thoroughly cleaned by placing the pipe I into clean or running water and using piston-rod F as before. The first part of pipe I should be removed and the sieve washed and wiped dry.

Having thus fully described my invention and the uses to which it applies, so that any person skilled in the art to which it belongs may construct or use the same, what I claim as new and useful, and desire to secure by Letters Patent of the United States, is—

1. In a syringe the combination of the gas-extracting pipe I constructed with a detachable part, and made to hold a perforated disk the chamber A, A, containing the valve-disks N and O, partition-plugs G and H forming inside chambers 1, 2 and 3, end plug K flexible tubing L pipe M, all secured to tube B, B, plunger D piston-rod cap C all constructed and arranged as described and for the purposes specified.

2. In a syringe the valve-tube A A secured to the tube B B at any suitable angle thereto, having the plug K partitions G and H disk-valves N and O chambers within said tube 1, 2 and 3 plunger D in tube B B piston-rod F all combined and arranged and operating as and for the purposes specified.

3. In a syringe the extracting-pipe I combined with the valve-chamber A A valves N and O, partitions G and H recesses, 1, 2 and 3 plug K flexible tube L pipe M, in combination with tube B, B, and piston F in the manner and for the purpose specified.

In testimony whereof I have signed my name to this specification in the presence of two subscribing witnesses.

JOSEPH R. PERRY.

Witnesses:
Q. A. GATES,
ROBT. J. BLAIR.